(12) United States Patent
Noda (10) Patent No.: US 6,825,993 B2
(45) Date of Patent: Nov. 30, 2004

(54) WIDE-ANGLE LENS HAVING ASPHERIC SURFACE

(75) Inventor: Takayuki Noda, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 37 days.

(21) Appl. No.: 10/370,758

(22) Filed: Feb. 24, 2003

(65) Prior Publication Data

US 2003/0174410 A1 Sep. 18, 2003

(30) Foreign Application Priority Data

Mar. 14, 2002 (JP) ........................................ 2002-069788

(51) Int. Cl.[7] .......................... G02B 15/14; G02B 9/34; G02B 9/58; G02B 13/04
(52) U.S. Cl. ...................... 359/749; 359/753; 359/781; 359/782; 359/783; 359/680
(58) Field of Search ................................ 359/749, 750, 359/751, 752, 753, 781, 782, 783, 680, 681, 682

(56) References Cited

U.S. PATENT DOCUMENTS 5,071,235 A * 12/1991 Mori et al. .................. 359/692
5,701,235 A * 12/1997 Hagemeyer Cook et al. . 362/26
6,417,975 B1 * 7/2002 Isono .......................... 359/783

FOREIGN PATENT DOCUMENTS

| JP | H9-166748 | 6/1997 |
| JP | H11-142730 | 5/1999 |
| JP | 2000-47101 | 2/2000 |
| JP | 2000-105334 | 4/2000 |

* cited by examiner

*Primary Examiner*—Tim Thompson
(74) *Attorney, Agent, or Firm*—Arnold International; Jon W. Henry; Bruce Y. Arnold (57) ABSTRACT

A fixed focal length, wide-angle lens includes, in order from the object side, a negative first lens group that includes a plastic negative lens element, a positive second lens group that includes a plastic positive lens element, a positive third lens group that includes a positive lens element joined on its image side to another lens element, and a positive fourth lens group. In the preferred embodiments, all lens groups except the third lens group are single lens elements that each include an aspheric lens surface. Also, the wide-angle lens preferably satisfies specified conditions that, together with the use of plastic lenses, joined lens elements, and aspheric surfaces, enables a high performance, compact, wide-angle lens of relatively simple construction to be produced.

13 Claims, 4 Drawing Sheets

Fig. 1

Spherical Aberration
Fig. 2A

Astigmatism
Fig. 2B

Distortion
Fig. 2C

Spherical Aberration
Fig. 4A

Astigmatism
Fig. 4B

Distortion
Fig. 4C

WIDE-ANGLE LENS HAVING ASPHERIC SURFACE

BACKGROUND OF THE INVENTION

Imaging devices, such as digital cameras and surveillance TV cameras, conventionally use image detecting elements such as a CCD (Charge Coupled Device) or a CMOS (Complementary Metal Oxide Semiconductor) image detecting device. In recent years, these image detecting devices have evolved so that they provide a high resolution detector in a compact configuration. Such performance demands that the imaging lens itself, which is used with such detectors be both compact and have a large aperture ratio or F-number so as to provide a bright image. Additionally, imaging lenses that provide wide angles of view are demanded. Furthermore, in some imaging devices, a so-called low-pass filter is often placed between the imaging lens and the image plane in order to reduce the high spatial frequency components of the object light for imaging. Therefore, an appropriately long back focus is needed in order to provide room for such a low-pass filter.

In order to satisfy the demands noted above, a retrofocus imaging lens which has a large aperture ratio and a wide angle of view, as well as a fixed focal length, may be designed. Known imaging lenses designed to meet the demands noted above are described in Japanese Laid-Open Patent Applications H09-166748, H11-142730, 2000-047101, and 2000-105334. The fixed focal length lenses described in these applications all consist of five lens elements, with the third and fourth lens elements from the object side forming one of four lens components.

However, the lenses described in these applications are not adequate in terms of high performance and compactness. For example, the lenses described in Japanese Laid-Open Patent Applications H09-166748, 2000-047101, and 2000-105334 all have a configuration in which the third and fourth lenses from the object side are negative and positive lens elements joined together, which results in a tendency for the back focus of the lenses to be excessively long, which, in turn, prevents the lens from being compact. Also, the lens described in Japanese Laid-Open Patent Application H11-142730 has the same problem of compactness in terms of its total length being at least four times its focal length.

BRIEF SUMMARY OF THE INVENTION

The present invention relates to a fixed focal length, wide-angle, high performance imaging lens that is compact and has a relatively simple configuration of lens elements that includes at least one plastic lens element and at least one lens element with an aspheric lens surface.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

First, definitions of the terms "lens element," lens component," and "lens group," that relate to the following detailed description will be given. The term "lens element" is herein defined as a single transparent mass of refractive material having two opposed refracting surfaces, which surfaces are positioned at least generally transversely of the optical axis of the reference lens. The term "lens component" is herein defined as (a) a single lens element spaced so far from any adjacent lens element that the spacing cannot be neglected in computing the optical image forming properties of the lens elements or (b) as two or more lens elements that have their adjacent lens surfaces either in full overall contact or are so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified.

Additionally, as used herein, the term "negative" preceding a lens element, lens component, or lens group means that the lens element, lens component, or lens group (as a whole) has a negative refractive power. Similarly, as used herein, the term "positive" preceding a lens element, lens component, or lens group means that the lens element, lens component, or lens group (as a whole) has a positive refractive power.

Figure 1:
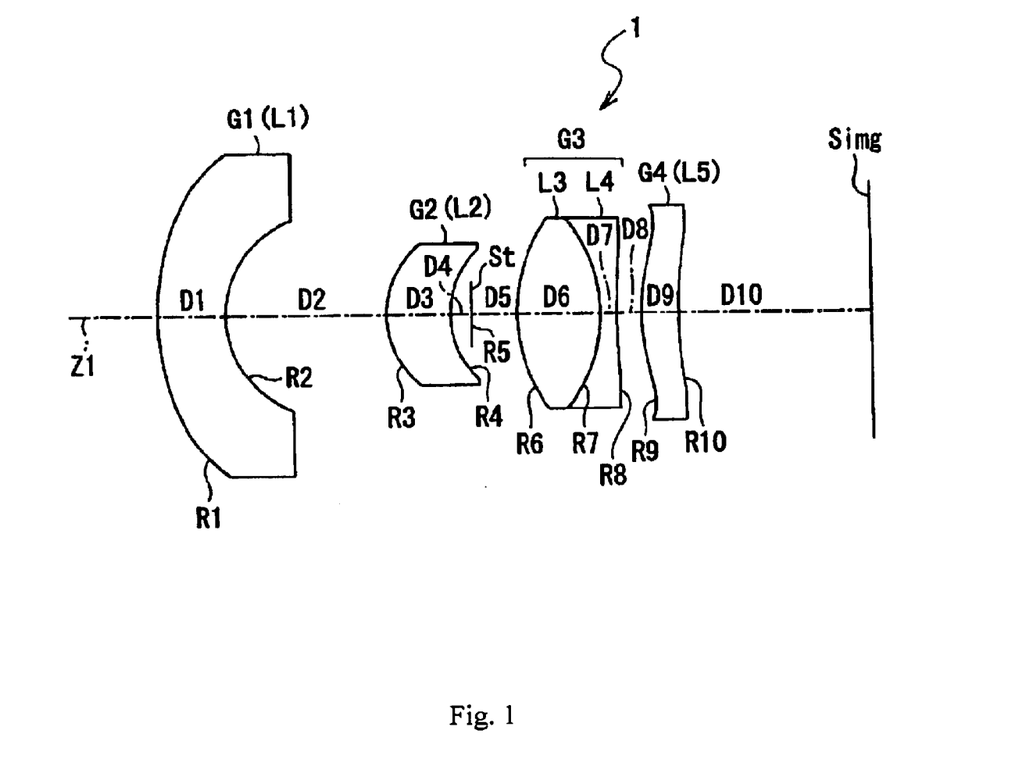
FIG. 1 shows a cross-sectional view of Embodiment 1 of the wide-angle lens of the present invention.

A general description of the preferred embodiments of the fixed focal length, wide-angle lens of the present invention will now be described with reference to FIG. 1 that shows Embodiment 1. In FIG. 1, lens groups are referenced by the letter G followed by a number denoting their order from the object side of the wide-angle lens, from G1 to G4, and lens elements are referenced by the letter L followed by a number denoting their order from the object side of the wide-angle lens, from L1 to L5. Similarly, the radii of curvature of the optical surfaces of all the optical elements, including those lens surfaces and a diaphragm that may serve as an aperture stop that is denoted as St, are referenced by the letter R followed by a number denoting their order from the object side of the wide-angle lens, from R1 to R10. The on-axis surface spacings (along the optical axis Z1 of FIG. 1) of all the optical surfaces are referenced by the letter D followed by a number denoting their order from the object side of the wide-angle lens, from D1 to D10.

With regard to the definitions of "lens group," "lens component," and "lens elements" above, in the two preferred embodiments of the wide-angle lens of the present invention described below, the lens groups G1, G2, and G4 are also the first, second, and fourth lens components, respectively, as well as the first, second, and fifth lens elements L1, L2, and L5, respectively, from the object side of the wide-angle lenses of these preferred embodiments.

The wide-angle lens of the present invention is particularly desirably designed for mounting in compact imaging devices such as digital cameras and surveillance TV cameras. As shown in FIG. 1, the diaphragm that may serve as an aperture stop St is positioned in the wide-angle lens 1 between the second lens group G2 and the third lens group G3. An image detecting element, such as a CCD or CMOS image detecting element is placed at an image forming plane, denoted as Simg in FIG. 1. A cover glass for protecting the imaging surface may be placed near the image forming plane.

At least one lens surface of the four lens groups G1–G4 includes a lens element with an aspheric lens surface. Preferably, at least two aspheric lens surfaces are present among the lens surfaces of the first lens group G1, the second lens group G2, and the fourth lens group G4, and more preferably, at least one lens surface of each of these lens groups is an aspheric lens surface. The use of aspheric lens surfaces makes it easier to correct various aberrations while still achieving compactness.

Those surfaces that are aspheric lens surfaces satisfy the following equation:

$$Z=[(Y^2/R)/\{1+(1-K\cdot Y^2/R^2)^{1/2}\}]+A_4Y^4+A_6Y^6+A_8Y^8+A_{10}Y^{10} \quad \text{(Equation A)}$$

where

Z is the length (in mm) of a line drawn from a point on the aspheric lens surface at a distance Y from the optical axis to the tangential plane of the aspherical surface vertex, R is the radius of curvature of the aspheric lens surface near the optical axis, Y is the distance (in mm) from the optical axis, K is the eccentricity, and $A_4$, $A_6$, $A_8$, and $A_{10}$ are the 4th, 6th, 8th, and 10th aspherical coefficients.

Additionally, it is desirable that the lens elements that include aspheric lens surfaces are made of synthetic resin, that is, plastic. Making the lens elements with aspheric lens surfaces of plastic provides advantages in manufacturing and processing and reduces the weight of the wide-angle lens. Further, it is desirable that the first lens group from the object side and the second lens group from the object side, G1 and G2, as shown in FIG. 1, include lens elements made of the same plastic.

Additionally, preferably the third lens group from the object side, G3, as shown in FIG. 1, is a positive lens group that includes a positive lens element joined on its image side to a negative lens element to form a positive doublet lens component, as shown with regard to lens elements L3 and L4 in FIG. 1. By forming those lens elements as one lens component, the total length of the wide-angle lens can be reduced to increase compactness without making the back focal length unnecessarily long.

Further, the following Condition (1) is preferably satisfied:

$$0.5 < D2/f < 1.0 \quad \text{Condition (1)}$$

where

D2 is the on-axis distance between the first lens group G1 and the second lens group G2, and f is the focal length of the wide-angle lens.

Condition (1) is a necessary condition for accurately correcting the curvature of field and reducing the total length of the wide-angle lens. By increasing the distance between the first lens group G1 and the second lens group G2, it is possible to reduce the powers of the first lens group G1 and the second lens group G2. With the powers of these lens groups reduced, it is possible to effectively correct various aberrations, especially lateral color. If the above ratio of Condition (1) is smaller than the lower limit of Condition (1), it is difficult to correct various aberrations, including lateral color. On the other hand, if the above ratio of Condition (1) is larger than the upper limit of Condition (1), the total length of the wide-angle lens increases so much that it is difficult to achieve the desired compactness of the wide-angle lens.

Additionally, the following Condition (2) is preferably satisfied:

$$N_{ave} < 1.65 \quad \text{Condition (2)}$$

where $N_{ave}$ is the arithmetic average of the refractive indexes at the e-line ($\lambda$=587.56 nm) of the materials from which all the lens elements of the wide-angle lens are made.

Further, preferably the following condition is satisfied:

$$\nu_{ave} > 44.0 \quad \text{Condition (3)}$$

where $\nu_{ave}$ is the arithmetic average of the Abbe numbers of the materials from which all the lens elements of the wide-angle lens are made.

Conditions (2) and (3) are conditions that work together for correcting longitudinal chromatic aberration and lateral color, especially in the case where two or more plastic lenses are used. Also, by satisfying Conditions (2) and (3), various aberrations, such as spherical aberration, chromatic aberration, and curvature of field, can also be corrected.

Additionally, preferably the following condition is satisfied:

$$-3.0 < f_{1-2}/f < -2.4 \quad \text{Condition (4)}$$

where $f_{1-2}$ is the composite focal length of the first lens group G1 and the second lens group G2, in order from the object side, of the wide-angle lens, and f is as defined above.

Condition (4) ensures that the curvature of field and the distortion are simultaneously corrected. By satisfying Condition (4), longitudinal chromatic aberration can also be corrected.

Additionally, preferably the following Condition (5) is satisfied:

$$-1.0 < f_4/f < -0.5 \quad \text{Condition (5)}$$

where $f_4$ is the focal length of the negative lens element in the third lens group that is joined on its object side to a positive lens element, and f is as defined above.

If the above ratio of focal lengths of Condition (5) is smaller than the lower limit of Condition (5), it becomes impossible to maintain favorable correction of various aberrations at various temperatures. On the other hand, if the above ratio of focal lengths of Condition (5) is larger than the upper limit of Condition (5), it becomes impossible to correct astigmatism and chromatic aberration at the same time.

Additionally, although the preferred embodiments of the wide-angle lens of the present invention include five lens elements arranged to form four lens components that form four lens groups, with the first lens group G1, the second lens group G2, and the fourth lens group G4 being lens components and elements, and the third lens element L3 and the fourth lens element L4 being joined to form one lens component, different arrangements may fall within the scope of the invention. For example, one or more of the lens elements that includes an aspheric lens surface may be formed as a thin plastic lens element with one aspheric lens surface and one spherical lens surface that is bonded to a spherical surface of a lens element of a different lens material, such as glass, to form a lens component that includes two lens elements.

Two preferred embodiments of the wide-angle imaging lens of the present invention will now be individually described with reference to the attached drawings.

Embodiment 1

FIG. 1 shows the basic lens element configurations of a fixed focal length, wide-angle lens 1 of the present invention. As shown in FIG. 1, the first lens group G1 from the object side of the wide-angle lens is a negative meniscus lens element L1 with its convex lens surface on the object side. Thus, the first lens group G1 is also the first lens component from the object side of the wide-angle lens, as well as a negative lens group. The second lens group G2 from the object side of the wide-angle lens is a positive meniscus lens element L2 with its convex lens surface on the object side. Thus, the second lens group G2 is also the second lens component from the object side of the wide-angle lens.

The third lens element L3 is a biconvex lens element that is a positive lens element. The fourth lens element L4 is a biconcave lens element with its concave lens surface of greater curvature on the object side. As shown in FIG. 1, the third and fourth lens elements, L3 and L4, respectively, are joined together to form a positive lens doublet component that is the third lens group G3 in order from the object side.

The fourth lens group G4 is a positive meniscus lens element L5 with a convex lens surface on the object side in its central region, although, as shown in FIG. 1, peripheral regions of the lens surfaces of the fifth lens element L5 may have a varied shape. The fourth lens group G4 is the third positive lens group in order from the object side.

Table 1 below lists the surface number #, in order from the object side, the radius of curvature R (in mm) of each surface near the optical axis, the on-axis surface spacing D (in mm), as well as the refractive index $N_e$ (at the e-line, λ=587.6 nm) and the Abbe number $v_d$ (at the d-line, λ=546.1 nm) of each lens element for Embodiment 1. Listed in the bottom portion of Table 1 are the focal length f, the f-number $F_{NO}$, and the image angle 2ω for Embodiment 1.

TABLE 1

| # | R | D | $N_e$ | $v_d$ |
|---|---|---|---|---|
| 1* | 11.940 | 2.76 | 1.51140 | 52.3 |
| 2 | 4.300 | 6.56 | | |
| 3* | 3.911 | 2.54 | 1.51140 | 52.3 |
| 4 | 3.903 | 0.86 | | |
| 5 (stop) | ∞ | 1.87 | | |
| 6 | 7.059 | 3.42 | 1.77621 | 49.6 |
| 7 | −6.395 | 0.65 | 1.81263 | 25.4 |
| 8 | 36.339 | 1.00 | | |
| 9* | 7.925 | 1.50 | 1.51140 | 52.3 |
| 10 | 18.830 | 7.86 | | |
| f = 9.1 mm | | $F_{NO}$ = 4.11 | | 2ω = 61.0° |

Those lens surfaces with a * to the right of the surface number in Table 1 are aspheric lens surfaces, and the aspheric surface shape of those lens elements is expressed by Equation (A) above.

Table 2 below lists the values of the constants K, $A_4$, $A_6$, $A_8$, and $A_{10}$ used in Equation (A) above for each of the aspherical surfaces indicated in Table 1. An "E" in the data indicates that the number following the "E" is the exponent to the base 10. For example, "1.0E-02" represents the number $1.0 \times 10^{-2}$.

TABLE 2

| # | K | $A_4$ | $A_6$ | $A_8$ | $A_{10}$ |
|---|---|---|---|---|---|
| 1 | 1.0000 | 0.1815E-3 | 0.3351E-5 | −0.5326E-7 | 0.1530E-8 |
| 3 | 1.0000 | −0.5640E-3 | −0.5567E-4 | 0.2694E-5 | 0.6969E-9 |
| 9 | 1.0000 | −0.1688E-2 | 0.1495E-4 | −0.2485E-5 | −0.7742E-8 |

The wide-angle lens of Embodiment 1 of the present invention satisfies all of Conditions (1) through (5) above as set forth in Table 3 below. The bottom portion of Table 3 recites, where necessary, the quantities that have been used to calculate the values that satisfy Conditions (1) through (5).

TABLE 3

| Condition No. | Condition | Value |
|---|---|---|
| (1) | 0.5 < D2 / f < 1.0 | 0.721 |
| (2) | $N_{ave}$ < 1.65 | 1.6246 |
| (3) | $v_{ave}$ > 44.0 | 46.38 |
| (4) | −3.0 < $f_{1-2}$ / f < −2.4 | −2.572 |
| (5) | −1.0 < $f_4$ / f < −0.5 | −0.730 |

D2= 6.56 mm  f = 9.1 mm  $N_{ave}$ = 1.6246
$v_{ave}$ = 46.38  $f_{1-2}$ = −23.42  $f_4$ = −6.646

Figures 2A, 2B:
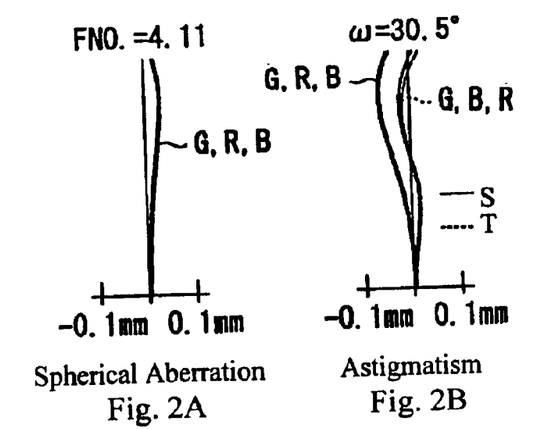
FIGS. 2A–2C show the spherical aberration, astigmatism, and distortion, respectively, of the wide-angle lens according to Embodiment 1.
Figure 2C:
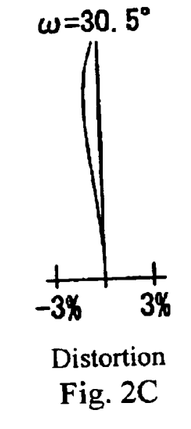
Figure 3A:
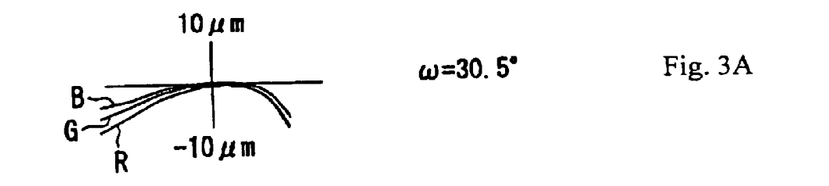
FIGS. 3A–3D show the coma in the tangential image plane at various half-image angles ω of the wide-angle lens according to Embodiment 1.
Figure 3B:
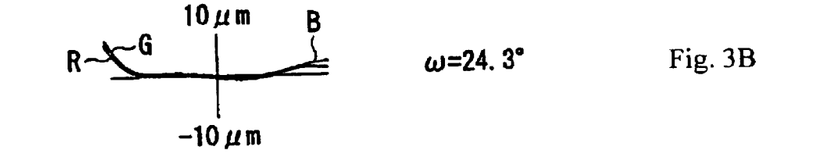
Figure 3C:
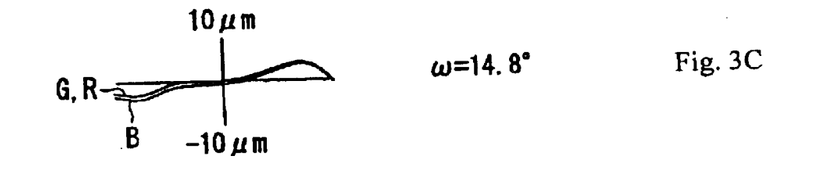
Figure 3D:
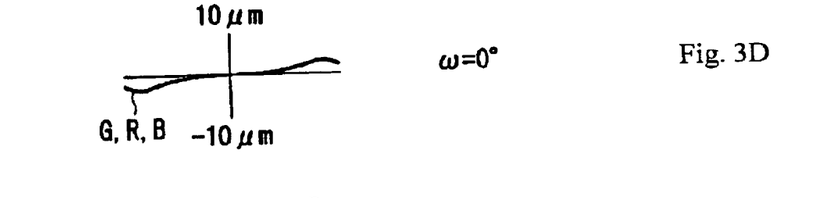
Figure 3E:
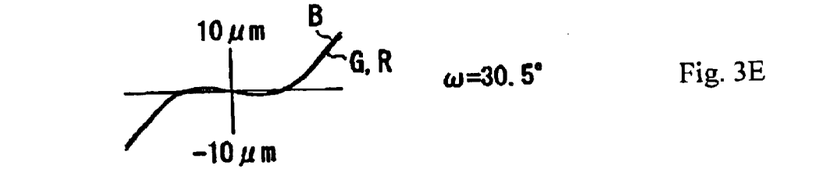
FIGS. 3E–3G show the coma in the sagittal image plane at various half-image angles ω of the wide-angle lens according to Embodiment 1.
Figure 3F:
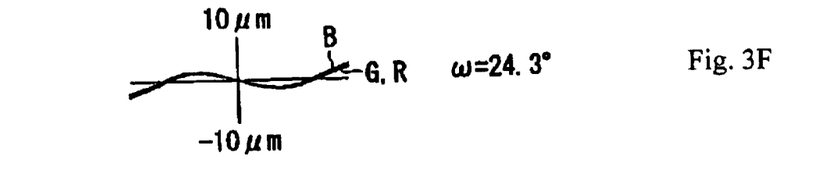
Figure 3G:
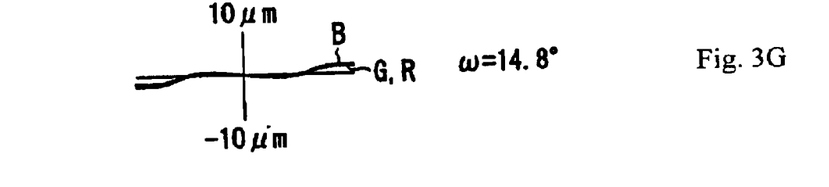

FIGS. 2A–2C show the spherical aberration, astigmatism and distortion, respectively, of the wide-angle lens of Embodiment 1. In FIG. 2B, the astigmatism is shown for both the sagittal image surface S and the tangential image surface T. FIGS. 3A–3D show coma in the tangential image plane at various half-image angles ω of the wide-angle lens of Embodiment 1, and FIGS. 3E–3G show the coma in the sagittal image plane at various half-image angles ω of the wide-angle lens of Embodiment 1. As the coma on-axis is identical in both the tangential and sagittal image planes, only a single curve is shown for ω=0°. In FIGS. 2A, 2B, and FIGS. 3A–3G, the symbols R, B, and G denote aberrations for red, blue, and green light, respectively. As is apparent from these figures, the various aberrations are favorably corrected.

Embodiment 2

Embodiment 2 is very similar to Embodiment 1 and uses the same number of lens elements. Because Embodiment 2 is very similar to Embodiment 1, only the differences between Embodiment 2 and Embodiment 1 will be explained for Embodiment 2. In Embodiment 2, the fourth lens element L4 is a negative meniscus lens element with its convex lens surface on the image side.

Table 4 below lists the surface number #, in order from the object side, the radius of curvature R (in mm) of each surface near the optical axis, the on-axis surface spacing D (in mm), as well as the refractive index $N_e$ (at the e-line, λ=587.6 nm) and the Abbe number $v_d$ (at the d-line, λ=546.1 nm) of each lens element for Embodiment 2. Listed in the bottom portion of Table 4 are the focal length f, the f-number $F_{NO}$, and the image angle 2ω for Embodiment 2.

TABLE 4

| # | R | D | $N_e$ | $v_d$ |
|---|---|---|---|---|
| 1* | 11.163 | 1.50 | 1.51140 | 52.3 |
| 2 | 4.200 | 5.71 | | |
| 3* | 5.000 | 2.50 | 1.51140 | 52.3 |
| 4 | 5.871 | 1.83 | | |
| 5 (stop) | ∞ | 1.87 | | |
| 6 | 8.596 | 4.77 | 1.77621 | 49.6 |
| 7 | −5.205 | 1.40 | 1.81264 | 25.4 |
| 8 | −38.184 | 0.10 | | |
| 9* | 8.810 | 1.50 | 1.51140 | 52.3 |
| 10 | 8.918 | 8.85 | | |
| f = 9.0 mm | | $F_{NO}$ = 4.11 | | 2ω = 61.6° |

Those lens surfaces with a * to the right of the surface number in Table 4 are aspheric lens surfaces, and the aspheric surface shape is expressed by Equation (A) above.

Table 5 below lists the values of the constants K, $A_4$, $A_6$, and $A_8$ used in Equation (A) above for each of the aspherical surfaces indicated in Table 4. In Table 5, $A_{10}$ is omitted because it is zero in Embodiment 2. An "E" in the data indicates that the number following the "E" is the exponent to the base 10. For example, "1.0E-02" represents the number $1.0 \times 10^{-2}$.

TABLE 5

| # | K | $A_4$ | $A_6$ | $A_8$ |
|---|---|---|---|---|
| 1 | 1.0000 | 0.2860E-3 | 0.5386E-6 | 0.1369E-6 |
| 3 | 1.0000 | −0.1341E-3 | −0.2486E-4 | 0.3926E-5 |
| 9 | 1.0000 | −0.1158E-2 | 0.1107E-5 | −0.1023E-5 |

The wide-angle lens of Embodiment 2 of the present invention satisfies all of Conditions (1) through (5) above as set forth in Table 6 below. The bottom portion of Table 6 recites, where necessary, the quantities that have been used to calculate the values that satisfy Conditions (1) through (5).

TABLE 6

| Condition No. | Condition | Value |
|---|---|---|
| (1) | 0.5 < D2 / f < 1.0 | 0.634 |
| (2) | $N_{ave}$ < 1.65 | 1.6246 |
| (3) | $v_{ave}$ > 44.0 | 46.38 |
| (4) | −3.0 < $f_{1-2}$ / f < −2.4 | −2.779 |
| (5) | −1.0 < $f_4$ / f < −0.5 | −0.840 |

D2 = 5.71 mm  f = 9.0 mm  $N_{ave}$ = 1.6246
$v_{ave}$ = 46.38  $f_{1-2}$ = −25.01  $f_4$ = −7.560

Figure 4A:
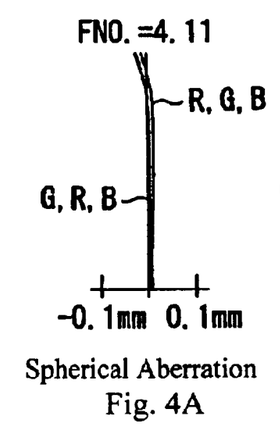
FIGS. 4A–4C show the spherical aberration, astigmatism, and distortion, respectively, of the wide-angle lens according to Embodiment 2.
Figure 4B:
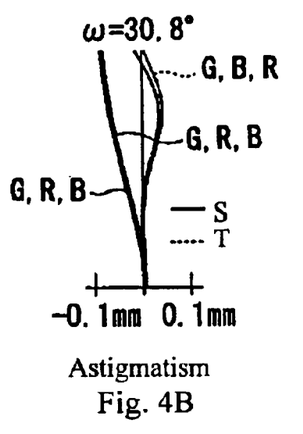
Figure 4C:
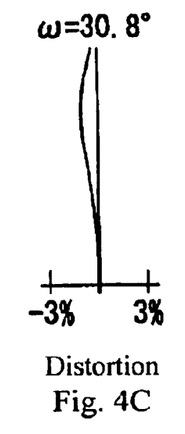
Figure 5A:
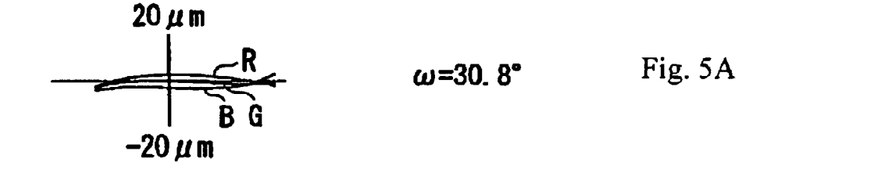
FIGS. 5A–5D show the coma in the tangential image plane at various half-image angles ω of the wide-angle lens according to Embodiment 2.
Figure 5B:
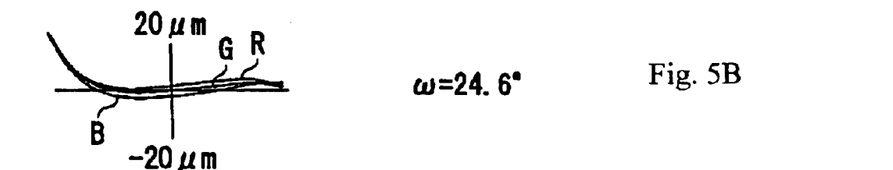
Figure 5C:
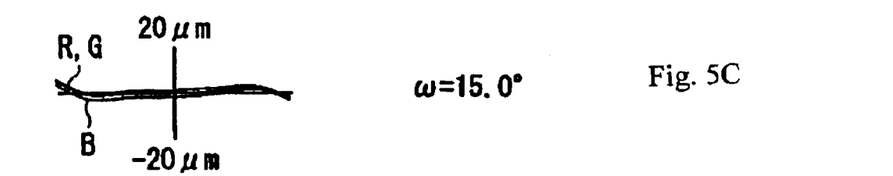
Figure 5D:
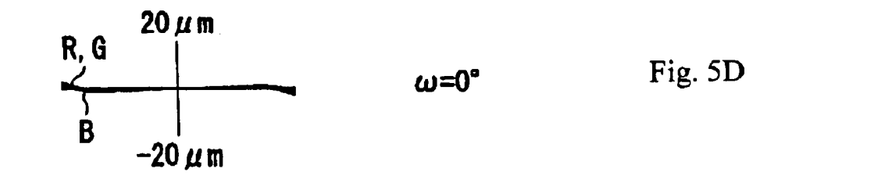
Figure 5E:
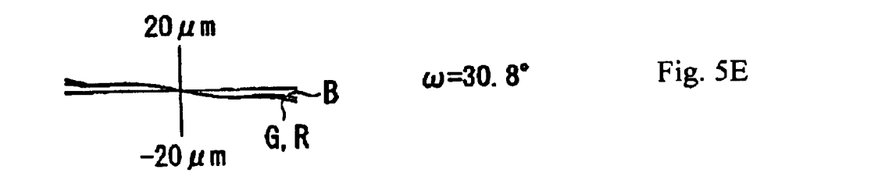
FIGS. 5E–5G show the coma in the sagittal image plane at various half-image angles ω of the wide-angle lens according to Embodiment 2.
Figure 5F:
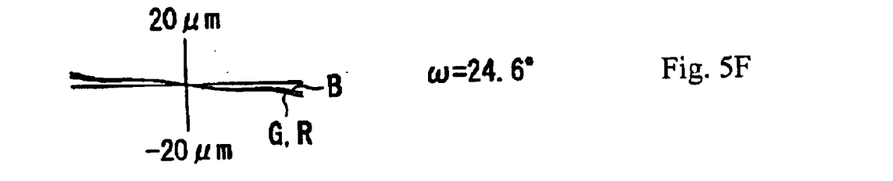
Figure 5G:
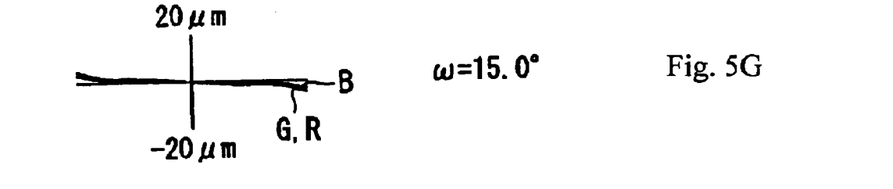

FIGS. 4A–4C show the spherical aberration, astigmatism and distortion, respectively, of the wide-angle lens of Embodiment 2. In FIG. 4B, the astigmatism is shown for both the sagittal image surface S and the tangential image surface T. FIGS. 5A–5D show the coma in the tangential image plane at various half-image angles ω of the wide-angle lens of Embodiment 2, and FIGS. 5E–5G show the coma in the sagittal image plane at various half-image angles ω of the wide-angle lens of Embodiment 2. In FIGS. 4A, 4B, and FIGS. 5A–5G, the symbols R, B, and G denote aberrations for red, blue, and green light, respectively. As is apparent from these figures, the various aberrations are favorably corrected.

The invention being thus described, it will be obvious that the same may be varied in many ways. For instance, values such as the radius of curvature R of each of the lens elements, the surface spacing D, the refractive index $N_e$, as well as the Abbe number $v_d$, are not limited to the examples indicated in each of the aforementioned embodiments, as other values can be adopted. Also, the number of lens elements and the particular lens elements that include aspheric surfaces, as well as the particular lens surfaces chosen to be aspheric may be varied. Additionally, the number of lens elements and the particular lens elements that are made of plastic may also be varied. Further, as discussed previously, lens components that are lens elements may variously include additional lens elements. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A wide-angle lens of fixed focal length consisting of four lens groups, in order from the object side, as follows:

a first lens group of negative refractive power that includes a plastic negative lens element;

a second lens group of positive refractive power that includes a plastic positive lens element;

a diaphragm;

a third lens group of positive refractive power that includes a positive lens component formed of a biconvex lens element joined on its image side to a negative lens element; and a fourth lens group;

wherein the wide-angle lens includes an optical axis and at least one lens element having at least one aspheric lens surface, and the following conditions are satisfied:

0.5<D2/f<1.0

$N_{ave}$<1.65

$v_{ave}$>44.0 where

D2 is the distance along the optical axis between the first lens group and the second lens group, f is the focal length of the wide-angle lens, $N_{ave}$ is the arithmetic average of the refractive indexes, at λ=587.6 nm, of the materials from which all the lens elements of the wide-angle lens are made, and $v_{ave}$ is the arithmetic average of the Abbe numbers, at λ=546.1 nm, of the materials from which all the lens elements of the wide-angle lens are made.

2. A wide-angle lens of fixed focal length consisting of four lens groups, in order from the object side, as follows:

a first lens group of negative refractive power that includes a plastic negative lens element;

a second lens group of positive refractive power that includes a plastic positive lens element;

a diaphragm;

a third lens group of positive refractive power that includes a positive lens component formed of a biconvex lens element joined on its image side to a negative lens element; and a fourth lens group;

wherein the wide-angle lens consists of four lens components, includes an optical axis and at least one lens element having at least one aspheric lens surface, and the following conditions are satisfied:

$$0.5 < D2/f < 1.0$$

$$N_{ave} < 1.65$$

$$\nu_{ave} > 44.0$$

where

D2 is the distance along the optical axis between the first lens group and the second lens group, f is the focal length of the wide-angle lens, $N_{ave}$ is the arithmetic average of the refractive indexes, at λ=587.6 nm, of the materials from which all the lens elements of the wide-angle lens are made, and $\nu_{ave}$ is the arithmetic average of the Abbe numbers, at λ=546.1 nm, of the materials from which all the lens elements of the wide-angle lens are made.

3. A wide-angle lens of fixed focal length consisting of four lens groups, in order from the object side, as follows:

a first lens group of negative refractive power that includes a plastic negative lens element;

a second lens group of positive refractive power that includes a plastic positive lens element;

a diaphragm;

a third lens group of positive refractive power that includes a positive lens component formed of a biconvex lens element joined on its image side to a negative lens element; and a fourth lens group;

wherein the wide-angle lens includes at least one lens element having at least one aspheric lens surface, and said plastic negative lens element and said plastic positive lens element are made of the same plastic material.

4. A wide-angle lens of fixed focal length consisting of four lens groups, in order from the object side, as follows:

a first lens group of negative refractive power that includes a plastic negative lens element;

a second lens group of positive refractive power that includes a plastic positive lens element;

a diaphragm;

a third lens group of positive refractive power that includes a positive lens component formed of a biconvex lens element joined on its image side to a negative lens element; and a fourth lens group;

wherein the wide-angle lens consists of four lens components, includes at least one lens element having at least one aspheric lens surface, and said plastic negative lens element and said plastic positive lens element are made of the same plastic material.

5. A wide-angle lens of fixed focal length consisting of only four lens groups, in order from the object side, as follows:

a first lens group of negative refractive power that includes a plastic negative lens element;

a second lens group of positive refractive power that includes a plastic positive lens element;

a third lens group that includes a positive lens component formed of a biconvex lens element joined on its image side to a further lens element; and a fourth lens group of positive refractive power, wherein at least two lens surfaces among the lens surfaces of said first lens group, said second lens group, and said fourth lens group are aspheric lens surfaces, and wherein the following conditions are satisfied:

$$-3.0 < f_{1\text{-}2}/f < -2.4$$

$$-1.0 < f_4/f < -0.5$$

where $f_{1\text{-}2}$ is the composite focal length of said first lens group and said second lens group, f is the focal length of the wide-angle lens, and $f_4$ is the focal length of said further lens element.

6. The wide-angle lens of claim 5, wherein the wide-angle lens consists of four lens components.

7. The wide-angle lens of claim 5, wherein the wide-angle lens consists of five lens elements.

8. The wide-angle lens of claim 5, and further comprising a diaphragm between said second lens group and said third lens group, and wherein at least one lens surface of each of said second lens group and said fourth lens group is an aspheric lens surface.

9. The wide-angle lens of claim 6, and further comprising a diaphragm between said second lens group and said third lens group, and wherein at least one lens surface of each of said second lens group and said fourth lens group is an aspheric lens surface.

10. The wide-angle lens of claim 5, wherein said plastic negative lens element and said plastic positive lens element are made of the same plastic material.

11. The wide-angle lens of claim 6, wherein said plastic negative lens element and said plastic positive lens element are made of the same plastic material.

12. A wide-angle lens of fixed focal length comprising, in order from the object side and with no other intervening lens elements:

a first lens component of negative refractive power that includes a plastic negative lens element;

a second lens component of positive refractive power that includes a plastic positive lens element;

a diaphragm;

a third lens component of positive refractive power that includes a biconvex lens element joined on its image side to a negative lens element; and a fourth lens component;

wherein the wide-angle lens includes at least one lens element that includes at least one aspheric lens surface, an optical axis and the following conditions are satisfied:

$$0.5 < D2/f < 1.0$$

$$N_{ave} < 1.65$$

$$\nu_{ave} > 44.0$$

where
- D2 is the distance along the optical axis between the first lens component and the second lens component,
- f is the focal length of the wide-angle lens,
- $N_{ave}$ is the arithmetic average of the refractive indexes, at λ=587.6 nm, of the materials from which all the lens elements of the wide-angle lens are made, and
- $v_{ave}$ is the arithmetic average of the Abbe numbers, at λ=546.1 nm, of the materials from which all the lens elements of the wide-angle lens are made.

13. A wide-angle lens of fixed focal length comprising, in order from the object side and with no other intervening lens elements:

- a first lens component of negative refractive power that includes a plastic negative lens element;
- a second lens component of positive refractive power that includes a plastic positive lens element;
- a diaphragm;
- a third lens component of positive refractive power that includes a biconvex lens element joined on its image side to a negative lens element; and
- a fourth lens component;

wherein
- the wide-angle lens includes at least one lens element that includes at least one aspheric lens surface, and
- said plastic negative lens element and said plastic positive lens element are made of the same plastic material.

* * * * *

UNITED STATES PATENT AND TRADEMARK OFFICE
CERTIFICATE OF CORRECTION

PATENT NO. : 6,825,993 B2  
DATED : November 30, 2004  
INVENTOR(S) : Noda

Page 1 of 1

It is certified that error appears in the above-identified patent and that said Letters Patent is hereby corrected as shown below:

Column 4,  
Line 35, change "the e-line ($\lambda = 587.56$ nm)" to -- the e-line, ($\lambda = 546.1$ nm) --;

Column 5,  
Line 63, change "(at the e-line, $\lambda = 587.6$ nm)" to -- (at the e-line, $\lambda = 546.1$ nm) --;  
Line 64, change "(at the d-line, $\lambda = 546.1$ nm)" to -- (at the d-line, $\lambda = 587.6$ nm) --;

Column 7,  
Line 9, change "(at the e-line, $\lambda = 587.6$ nm)" to -- (at the e-line, $\lambda = 546.1$ nm) --;  
Line 10, change "(at the e-line, $\lambda = 546.1$ nm)" to -- (at the d-line, $\lambda = 587.6$ nm) --;

Column 8,  
Line 61, change "at $\lambda = 587.6$ nm" to -- at $\lambda = 546.1$ nm --;  
Line 64, change "at $\lambda = 546.1$ nm" to -- at $\lambda = 587.6$ nm --;

Column 9,  
Line 29, change "$\lambda = 587.6$ nm" to -- $\lambda = 546.1$ nm --;  
Line 32, change "$\lambda = 546.1$ nm" to -- $\lambda = 587.6$ nm --;

Column 11,  
Line 6, change "$\lambda = 587.6$ nm" to -- $\lambda = 546.1$ nm --; and  
Line 10, change "$\lambda = 546.1$ nm" to -- $\lambda = 587.6$ nm --.

Signed and Sealed this

First Day of March, 2005

JON W. DUDAS  
*Director of the United States Patent and Trademark Office*

UNITED STATES PATENT AND TRADEMARK OFFICE
CERTIFICATE OF CORRECTION

PATENT NO. : 6,825,993 B2
DATED : November 30, 2004
INVENTOR(S) : Noda

It is certified that error appears in the above-identified patent and that said Letters Patent is hereby corrected as shown below:

Column 4,
Line 35, change "the e-line ($\lambda$ = 587.56 nm)" to -- the e-line, ($\lambda$ = 546.1 nm) --;

Column 5,
Line 63, change "(at the e-line, $\lambda$ = 587.6 nm)" to -- (at the e-line, $\lambda$ = 546.1 nm) --;
Line 64, change "(at the d-line, $\lambda$ = 546.1 nm)" to -- (at the d-line, $\lambda$ = 587.6 nm) --;

Column 7,
Line 9, change "(at the e-line, $\lambda$ = 587.6 nm)" to -- (at the e-line, $\lambda$ = 546.1 nm) --;
Line 10, change "(at the d-line, $\lambda$ = 546.1 nm)" to -- (at the d-line, $\lambda$ = 587.6 nm) --;

Column 8,
Line 61, change "at $\lambda$ = 587.6 nm" to -- at $\lambda$ = 546.1 nm --;
Line 64, change "at $\lambda$ = 546.1 nm" to -- at $\lambda$ = 587.6 nm --;

Column 9,
Line 29, change "$\lambda$ = 587.6 nm" to -- $\lambda$ = 546.1 nm --;
Line 32, change "$\lambda$ = 546.1 nm" to -- $\lambda$ = 587.6 nm --;

Column 11,
Line 6, change "$\lambda$ = 587.6 nm" to -- $\lambda$ = 546.1 nm --; and
Line 10, change "$\lambda$ = 546.1 nm" to -- $\lambda$ = 587.6 nm --.

This certificate supersedes Certificate of Correction issued March 1, 2005.

Signed and Sealed this

Twenty-eighth Day of June, 2005

JON W. DUDAS
*Director of the United States Patent and Trademark Office*